Oct. 4, 1960 E. J. TISCHLER 2,954,795
CONTROLS FOR BRINE SUPPLY SYSTEMS
Filed Feb. 6, 1958

INVENTOR
EDWARD J. TISCHLER
BY John E. Stryker
ATTORNEY

United States Patent Office 2,954,795
Patented Oct. 4, 1960

2,954,795

CONTROLS FOR BRINE SUPPLY SYSTEMS

Edward J. Tischler, St. Paul, Minn., assignor, by mesne assignments, to Union Tank Car Company, Chicago, Ill., a corporation of New Jersey Filed Feb. 6, 1958, Ser. No. 713,697

3 Claims. (Cl. 137—103)

This invention relates to controls for brine supply systems for water softeners, including improved valve means for such a system having a brine tank and a conduit for alternately withdrawing brine from the tank and then replacing brine with a fresh supply of liquid, usually water, in a predetermined accurately measured quantity.

It is an object of my invention to provide novel and reliable valve means which are responsive to variations in the fluid pressure in a conduit connected to the brine supply system for controlling alternate withdrawal of brine from the brine tank and replacement of the brine with a fresh supply of liquid.

A further object is to provide in a control of the class described a measuring container for replacement liquid disposed to receive liquid from and discharge it through valve means having fluid pressure responsive actuating means adapted to be activated to cause a charge of replacement liquid to be discharged into the brine tank when a predetermined volume of liquid has been received in the measuring container.

A further and particular object is to provide for a brine tank adapted to contain a large quantity of solid salt, means for withdrawing concentrated brine from the lower portion of said tank in combination with means for delivering accurately measured quantities of replacement liquid to the upper surface of the body of solid salt so that the replacement liquid is caused to filter down through the body of solid salt before being withdrawn as concentrated brine.

The invention also includes certain other novel features of construction which will be pointed out in the following specification and claims.

Referring to the accompanying drawing which illustrates, by way of example and not for the purpose of limitation, a preferred embodiment of my invention:

Figure 1:
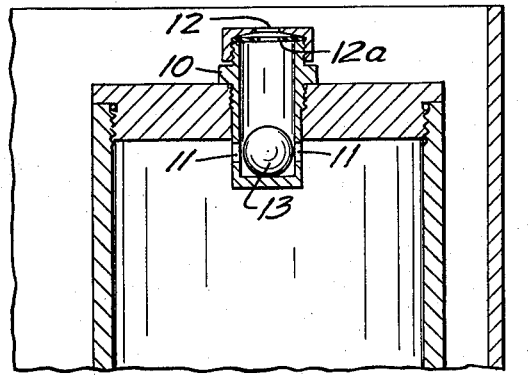
Figure 1 is a central vertical sectional view taken longitudinally through the valve mechanism and showing the measuring container and a portion of the brine tank.
Figure 1:
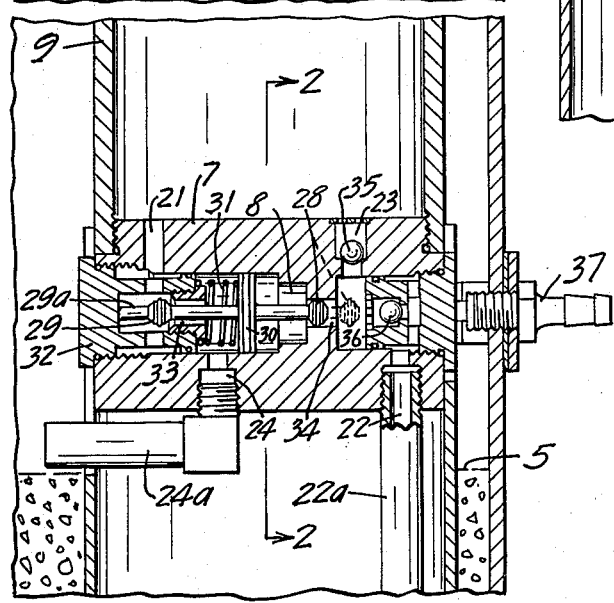
Figure 1:
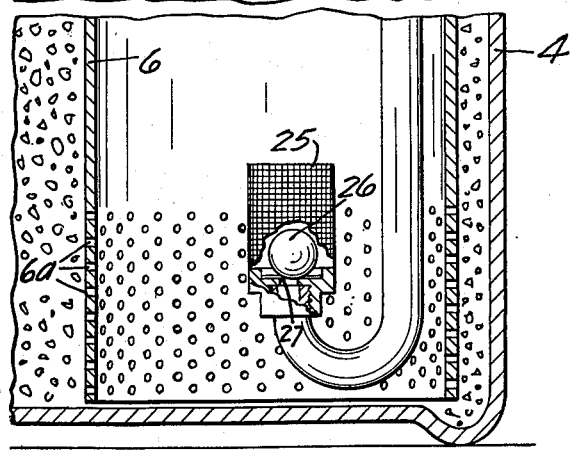

As shown in Fig. 1, my brine supply system has a relatively large brine tank 4 adapted to store a large quantity of solid salt which may extend to a level indicated at 5 below the main flow control valve and measuring container hereinafter described. Liquid for forming brine is supplied to the upper surface of the body of solid salt in the tank 4. This brine tank preferably contains a brine well 6 having suitable openings 6a placing the lower part of the well in continuous communication with the lower part of the brine tank. Closing the upper portion of the well 6 is a valve casing, indicated generally at 7, formed with the main chamber 8 and the several flow passages hereinafter described.

A replacement liquid measuring container 9 extends upwardly from the casing 7 and is provided at its upper end with an air vent indicated generally at 10. This vent has a tubular body formed with side openings 11 within the container 9 and a top opening 12 which is open to atmosphere at the open top of the brine tank. Within the air vent casing, a float type check ball 13 is arranged to close the upper end opening 12 when the container 9 is full of liquid. A flexible diaphragm 12a having a circular opening forms a seat for the ball 13 below the opening 12.

Figure 2:
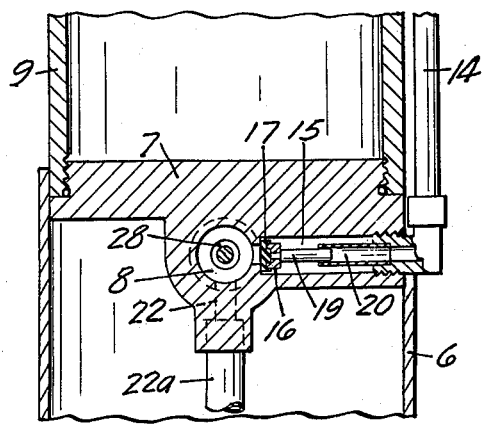
Fig. 2 is a fragmentary vertical sectional view taken on the line 2—2 of Fig. 1.
Figure 3:
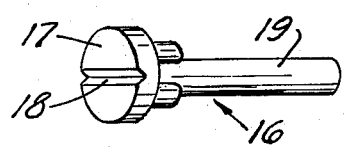
Fig. 3 is a perspective view showing the device for regulating the rate of flow of replacement liquid to the measuring container.

A conduit 14 (Fig. 2) is in continuous communication with the chamber 8 of the valve casing and is adapted alternately to draw brine from the brine tank and supply replacement liquid to the measuring container 9. At its lower end conduit 14 is connected by a passage 15 to a port opening into the chamber 8. The rate of flow through the passage 15 to the chamber 8 is under control of a flow regulating device indicated generally at 16 in Figs. 2 and 3. As shown in Fig. 3, the device 16 has a circular head 17 formed with a cross slot 18 in the seat face of the head which permits flow at a restricted, suitably low rate from the conduit 14 to the chamber 8. The head 17 fits loosely in the passage 15 and a stem 19 projects from the head 17 and fits loosely in guide tube 20 so that when brine is withdrawn from the chamber 8 under subatmospheric pressure in the conduit 14, the device 16 moves to the right as seen in Fig. 2 to increase the rate of flow past the head 17 and stem 19 and through the guide 20 and conduit 14.

Communicating with the chambered interior of the valve casing 7 is a first inlet passage 21, a second inlet passage 22, a first outlet passage 23 and a second outlet passage 24. Passages 21 and 23 are in continuous communication at their upper ends with the bottom of the container 9. Passage 22 includes a tubular extension 22a adapted to draw brine from the lower portion of the well 6. Extension 22a is formed with a U-shaped end portion within the well 6 which is fitted with a foraminous cage 25 containing a float type check ball 26. Check ball 26 is arranged to close a central opening in a flexible diaphragm seat 27 when the level of brine is reduced to the approximate elevation of this seat. Passage 24 has a tubular extension 24a adapted to discharge replacement liquid into the brine tank 4 at an elevation above the normal high level of solid salt in this tank.

Valve members 28 and 29 are fixed on a coaxial stem which rigidly connects them to a fluid pressure actuated piston member 30. One face of the member 30 is subject to variable fluid pressure in the chamber 8 and the second face is subject to atmospheric pressure. This member is spring biased toward the broken line position indicated in Fig. 1 by a spring 31 which is confined between the second face of member 30 and a removable screw threaded casing member 32. Thus the spring 31 biases the piston member 30 and heads 28 and 29 toward the broken line position wherein a passage 33 connecting the passage 21 to the passage 24 is closed and a passage 34 connecting the chamber 8 to a second chamber communicating with the passages 22 and 23 is open. The valve members 28 and 29 are preferably provided with elastic flexible sealing rings which fit slidably in the passages 33 and 34 respectively. When in the full line position shown in Fig. 1, the member 28 closes the passage 34 and the member 29 is open in relation to the passage 33 so that communication is established between the passages 21 and 24.

Interposed in the passage 23 is a check valve comprising a ball 35 which is normally closed on a seat to prevent flow from the container 9 to the main valve chamber 8 and is moved to an open position when the pressure in chamber 8 and passage 34 is sufficiently high to raise the ball from its seat. Similarly a check valve comprising a ball 36 is interposed in the passage 22 communicating with the lower portion of the brine well to prevent flow from the passage 34 through passage 22 to the lower portion of the brine well while permitting brine to be withdrawn under reduced pressure to chamber 8 when valve member 28 is in its open, broken line position.

*Operation*

In operation, the spring 31 normally retains the valve member 28 in the broken line position wherein the passage 34 is open and member 29 closes passage 33. To refill or replace liquid in the brine tank, water or other suitable liquid may be supplied under pressure above atmospheric pressure through the conduit 14. Such liquid now flows to container 9 at the restricted rate determined by the device 16. From chamber 8 this flow is through passages 34 and 23 to container 9 until the liquid fills the container 9 and raises the check ball 13 to close at its seat 12a. Pressure now builds up in the container 9 and chamber 8 to force piston 30 to the left closing passage 34 and opening the passage 33. The liquid in the container 9 is thereby allowed to flow by gravity through the passages 21, 33, 24 and extension 24a to the brine tank 4 above the level of the solid salt. During this discharge from container 9, since passage 34 is closed, the liquid under super-atmospheric pressure from conduit 14 acts on the larger area of the piston 30 to retain the piston and valve members 28 and 29 in the full line position.

To withdraw brine from the tank 4 suitable sub-atmospheric pressure is created in the conduit 14. The required suction effect may be obtained by the use of an aspirator or other conventional brine draw mechanism of water softening apparatus. The resulting reverse flow through flow control device 16 moves it to wide open position and the sub-atmospheric pressure in the chamber 8 acting on the piston 30 causes this piston and the connected valve members 28 and 29 to move to the right, thereby opening passage 34 and closing passage 33. Brine is now drawn from the lower portion of the well 6 through extension 22a, (check ball 26 being in its elevated position) and through passage 22, past the check ball 36, through passage 34 to chamber 8 and thence through conduit 14 to the water softening apparatus. This draw of brine may continue until check ball 26 settles on its seat 27 to cut off the flow of air as well as brine to the conduit 14.

It will be evident that as long as pressure above atmospheric is maintained in the chamber 8, the valve mechanism will remain in the full line position. When container 9 has been filled, the charge of liquid is discharged into the brine tank and the flow passages are closed by valve member 28 and check ball 36. It will be further evident that the quantity of replacement liquid is accurately measured by the container 9 so that only a predetermined quantity of the brine is available for withdrawal for the succeeding regenerating operation.

I claim:

1. In a brine supply system having a brine tank, a measuring container for a charge of replacement liquid and a conduit for alternately supplying liquid to said tank and withdrawing brine therefrom; valve means for controlling flow to and from said tank and container comprising, a casing having a first chamber connected to said conduit; a second chamber; a main passage for flow between said chambers; a first outlet passage for flow of liquid from said second chamber to said container; a check valve in said first outlet passage; a second outlet passage for flow from said first chamber to said tank; a first inlet passage for flow from said container to said first chamber; a second inlet passage for flow from the lower portion of said tank to said second chamber; a check valve in said second inlet passage; pressure responsive valve actuating means movable in response to changes in fluid pressure in said first chamber; a first valve member controlling flow through said main passage, operatively connected to said actuating means and movable to a first position opening said main passage when said actuating means is subject to a predetermined low pressure in said first chamber, said member being movable to a second position closing said main passage upon the occurrence of a predetermined high pressure in said first chamber; and a second valve member operatively connected to said valve actuating means and having a coacting seat in said casing for controlling flow between said first inlet passage and said second outlet passage, said second valve member being movable to a position establishing flow from said first inlet passage to said second outlet passage when said actuating means is subject to said predetermined high pressure in said first chamber.

2. A brine supply system as in claim 1 in which said pressure responsive valve actuating means are spring biased normally to retain said first valve member in said first position and said second valve member in position to cut off flow from said container to said tank.

3. In a brine supply system having a brine tank, a measuring container for a charge of replacement liquid and a conduit for alternately supplying liquid to said tank and withdrawing brine therefrom; valve means for controlling flow to and from said tank and container comprising; an air vent communicating with the upper portion of said container; float valve means for closing said air vent when said container has received a predetermined replacement charge of liquid; a casing having a first chamber connected to said conduit; a second chamber; a main passage for flow between said chambers; a first outlet passage for flow of liquid from said second chamber to said container; a check valve in said first outlet passage; a second outlet passage for flow from said first chamber to said tank; a first inlet passage for flow from said container to said first chamber; a second inlet passage for flow from the lower portion of said tank to said second chamber; a check valve in said second inlet passage; pressure responsive valve actuated means movable in response to changes in fluid pressure in said first chamber; a first valve member controlling flow through said main passage, operatively connected to said actuating means, and movable to a first position opening said main passage when said actuating means is subject to a predetermined low pressure in said first chamber, said member being movable to a second position closing said main passage upon the occurrence of predetermined high pressure in said first chamber; and a second valve member operatively connected to said valve actuating means and having a coacting seat in said casing for controlling flow between said first inlet passage and said second outlet passage, said second valve member being movable to a position establishing flow from said first inlet passage to said second outlet passage when said actuating means is subject to a predetermined high pressure in said first chamber caused by the closing of said air vent.

References Cited in the file of this patent

UNITED STATES PATENTS

| 122,544 | Westinghouse | Jan. 9, 1872 |
| 976,556 | Dalen | Nov. 22, 1910 |
| 2,608,986 | Stephens | Sept. 2, 1952 |